United States Patent
Kim et al.

(10) Patent No.: US 10,891,150 B2
(45) Date of Patent: Jan. 12, 2021

(54) STORAGE CONTROL METHOD AND STORAGE CONTROLLER FOR USER INDIVIDUAL SERVICE ENVIRONMENT

(71) Applicant: GLUESYS CO., LTD., Anyang-si (KR)

(72) Inventors: Tae Hoon Kim, Yongin-si (KR); Gyeong Hun Kim, Suwon-si (KR)

(73) Assignee: GLUESYS CO., LTD., Anyang-si (KR)

( * ) Notice: Subject to any disclaimer, the term of this patent is extended or adjusted under 35 U.S.C. 154(b) by 97 days.

(21) Appl. No.: 16/379,041

(22) Filed: Apr. 9, 2019

(65) Prior Publication Data

US 2020/0210219 A1 Jul. 2, 2020

(30) Foreign Application Priority Data

Dec. 28, 2018 (KR) .................. 10-2018-0171477

(51) Int. Cl.
*G06F 9/455* (2018.01)
*G06F 12/02* (2006.01)
*G06F 12/06* (2006.01)
*G06F 9/50* (2006.01)

(52) U.S. Cl.
CPC ........ *G06F 9/45558* (2013.01); *G06F 9/5077* (2013.01); *G06F 12/0253* (2013.01); *G06F 12/0646* (2013.01); *G06F 2009/4557* (2013.01); *G06F 2009/45579* (2013.01); *G06F 2009/45583* (2013.01); *G06F 2212/1041* (2013.01); *G06F 2212/152* (2013.01)

(58) Field of Classification Search
CPC ............... G06F 9/45558; G06F 9/5077; G06F 2009/4557

USPC ...................................................... 718/1–108
See application file for complete search history.

(56) References Cited

U.S. PATENT DOCUMENTS

| | | | | |
|---|---|---|---|---|
| 10,331,476 B1* | 6/2019 | Vemuri | ................ | G06F 12/10 |
| 2011/0302578 A1* | 12/2011 | Isci | .................. | G06F 9/5077 |
| | | | | 718/1 |
| 2014/0351809 A1* | 11/2014 | Chawla | ............. | G06F 3/0665 |
| | | | | 718/1 |

(Continued)

FOREIGN PATENT DOCUMENTS

| | | |
|---|---|---|
| JP | 2018-169773 A | 11/2018 |
| KR | 10-2013-0112755 A | 10/2013 |
| KR | 10-1539895 B1 | 7/2015 |

OTHER PUBLICATIONS

Luizelli, Marcelo Caggiani, et al. "Piecing together the NFV provisioning puzzle: Efficient placement and chaining of virtual network functions." 2015 IFIP/IEEE International Symposium on Integrated Network Management (IM). IEEE, 2015.pp. 98-106 (Year: 2015).*

(Continued)

*Primary Examiner* — Satish Rampuria (57) ABSTRACT

Disclosed are a storage control method and a storage controller for a virtualization environment with which to provide a virtualization service. The disclosed storage control method may include adjusting an over-provisioning proportion for a virtual storage device allotted to each virtual machine according to an I/O workload pattern for each of the virtual machines; and allotting an over-provisioning space for each of the virtual storage devices according to the over-provisioning proportion.

8 Claims, 4 Drawing Sheets

(56) References Cited

U.S. PATENT DOCUMENTS

2015/0263986 A1* 9/2015 Park .................. G06F 3/067
709/226
2017/0346760 A1* 11/2017 Kelly .................. H04L 67/1097

OTHER PUBLICATIONS

Aparicio-Pardo, Ramon, et al. "Balancing CapEx reduction and network stability with stable routing-virtual topology capacity adjustment (SR-VTCA)." Optical Switching and Networking 10.4 (2013): pp. 343-353. (Year: 2013).*

Spinner, Simon, et al. "Proactive memory scaling of virtualized applications." 2015 IEEE 8th International Conference on Cloud Computing. IEEE, 2015.pp. 277-284 (Year: 2015).*

Darabseh, Ala, et al. "Sdstorage: a software defined storage experimental framework." 2015 IEEE International Conference on Cloud Engineering. IEEE, 2015.pp. 341-346 (Year: 2015).*

Chowdhury, NM Mosharaf Kabir, Fida-E. Zaheer, and Raouf Boutaba. "iMark: An identity management framework for network virtualization environment." 2009 IFIP/IEEE International Symposium on Integrated Network Management. IEEE, 2009.pp. 335-342 (Year: 2009).*

Zhang, Jianyong, et al. "Storage performance virtualization via throughput and latency control." ACM Transactions on Storage (TOS) 2.3 (2006): pp. 283-308. (Year: 2006).*

* cited by examiner

STORAGE CONTROL METHOD AND STORAGE CONTROLLER FOR USER INDIVIDUAL SERVICE ENVIRONMENT

CROSS-REFERENCE TO RELATED APPLICATIONS

This application claims priority under 35 U.S.C 119(a) to Korean Patent Application No. 10-2018-0171477, filed with the Korean Intellectual Property Office on Dec. 28, 2018, the disclosure of which is incorporated herein by reference in its entirety.

BACKGROUND

1. Technical Field

The present disclosure relates to a storage control method and a storage controller, more particularly to a storage control method and storage controller for an environment configured to provide a user individual service known as a virtualization service.

2. Description of the Related Art

Virtualization refers to a software technology that involves concealing the physical components of a computer, such as the CPU, memory, and disk, and creating multiple environments having virtual hardware elements as if equipped with the CPU or memory. As virtualization allows the resources to be distributed logically, it can increase the resource availability of the system, and as resources can be added or reduced as necessary, it allows for easier expansion. With virtualization technology, a hypervisor can be utilized to run multiple operating systems on one host machine. A hypervisor may be of a bare metal type or a hosted type.

In a virtualization environment, the physical storage resources of a host machine may be logically allotted to each virtual machine, and file I/O (input/output) may be performed for each of the virtual machines. Since the file I/O consumes many resources in a virtualization environment, various control methods for increasing the performance of the virtualization system are being studied.

Meanwhile, the all-flash storage device, previously used only in certain areas, is now being established as the standard of IT infrastructure across all fields of industry. The SSD mounted on the all-flash storage device exhibits a higher performance compared to the hard disk, and support of the NVMe (Non-Volatile Memory express) interface is allowing even more powerful performance.

However, as a SSD is unable to write data over a page on which there is data already written, garbage collection is necessary, which is to delete pages in a stale state to create pages of a free state. As deleting a page requires more time compared to writing a page, performing garbage collection in the foreground can lead to lowered performance of the storage, and as such, various techniques are being adopted such as performing garbage collection in the background.

SUMMARY

An aspect of the disclosure is to provide a storage control method and a storage controller for a virtualization environment that provides a virtualization service.

In particular, an aspect of the disclosure is to provide a storage control method and a storage controller that can prevent performance degradation caused by foreground garbage collection.

An embodiment of the disclosure conceived to achieve the objective above provides a storage control method for a user individual service environment, where the storage control method includes: adjusting an over-provisioning proportion for a virtual storage device allotted to each virtual machine according to an I/O workload pattern for each of the virtual machines; and allotting an over-provisioning space for each of the virtual storage devices according to the over-provisioning proportion.

Another embodiment of the disclosure conceived to achieve the objective above provides a storage control method for a user individual service environment, where the storage control method includes: determining a foreground garbage collection risk level for each of a multiple number of SSD's included in a storage device according to a use rate of the SSD; writing in a spare storage space if there occurs a write request for a virtual storage device allotted to a first SSD having a maximum risk level of foreground garbage collection occurring; and restoring data written in the spare storage space to the first SSD when the foreground garbage collection is completed.

Still another embodiment of the disclosure conceived to achieve the objective above provides a storage system for a user individual service environment, where the storage system includes: a database configured to store block I/O information for virtual machines provided from a hypervisor; and a storage controller configured to adjust an over-provisioning proportion for a virtual storage device allotted to each of the virtual machines according to an I/O workload pattern for the virtual machine.

Yet another embodiment of the disclosure conceived to achieve the objective above provides a storage device for a user individual service environment, where the storage device includes: a storage controller configured to determine a foreground garbage collection risk level for each of a multiple number of SSD's included in a storage device according to a use rate of the SSD; and a spare storage space configured to store data corresponding to a write request if the write request occurs for a virtual storage device allotted to a SSD having a maximum risk level of foreground garbage collection occurring.

An embodiment of the disclosure can enable background garbage collection by way of extra space referred to as an over-provisioning space, to smoothly process I/O requests for virtual machines.

Also, an embodiment of the disclosure can optimize the over-provisioning proportion according to I/O workload patterns, thereby increasing the performance of the virtual storage device while minimizing wasted resources.

Furthermore, an embodiment of the disclosure can process data I/O requests in a continuous and stable manner by minimizing the occurrence of foreground garbage collection, and by distributing I/O requests for all SSD's included in the storage device, can improve the overall lifespan of the storage.

In addition, an embodiment of the disclosure can smoothly process data I/O requests without loss of data even when foreground garbage collection does occur.

Additional aspects and advantages of the present disclosure will be set forth in part in the description which follows, and in part will be obvious from the description, or may be learned by practice of the disclosure.

DETAILED DESCRIPTION

As the disclosure allows for various changes and numerous embodiments, particular embodiments will be illustrated in the drawings and described in detail in the written description. However, this is not intended to limit the present disclosure to particular modes of practice, and it is to be appreciated that all changes, equivalents, and substitutes that do not depart from the spirit and technical scope of the present disclosure are encompassed in the present disclosure. In describing the drawings, similar reference numerals are used for similar elements.

An aspect of the disclosure presents a method and device that reduce the possibility of garbage collection occurring in the foreground and thus enable efficient use of the SSD of a storage device for a virtualization environment.

To this end, an embodiment of the disclosure may allot over-provisioning spaces to virtual storage devices that have been allotted to virtual machines. Over-provisioning involves setting the number of logical blocks to be smaller than the number of physical blocks of a SSD, and an embodiment of the disclosure may employ this concept in virtual storage devices to allot over-provisioning spaces, which are a type of spare storage spaces, to the virtual storage devices. That is, the resources of the SSD's may be additionally allotted to the virtual storage devices tantamount to the over-provisioning spaces. By performing background garbage collection through the over-provisioning spaces, the possibility of foreground garbage collection can be reduced in the SSD's to which the virtual storage devices are allotted.

Another embodiment of the disclosure may determine the risk level of foreground garbage collection for each of a multiple number of SSD's mounted on a storage device and may perform various control operations according to the risk levels.

A more detailed description of certain embodiments of the disclosure is provided below with reference to the accompanying drawings.

Figure 1:
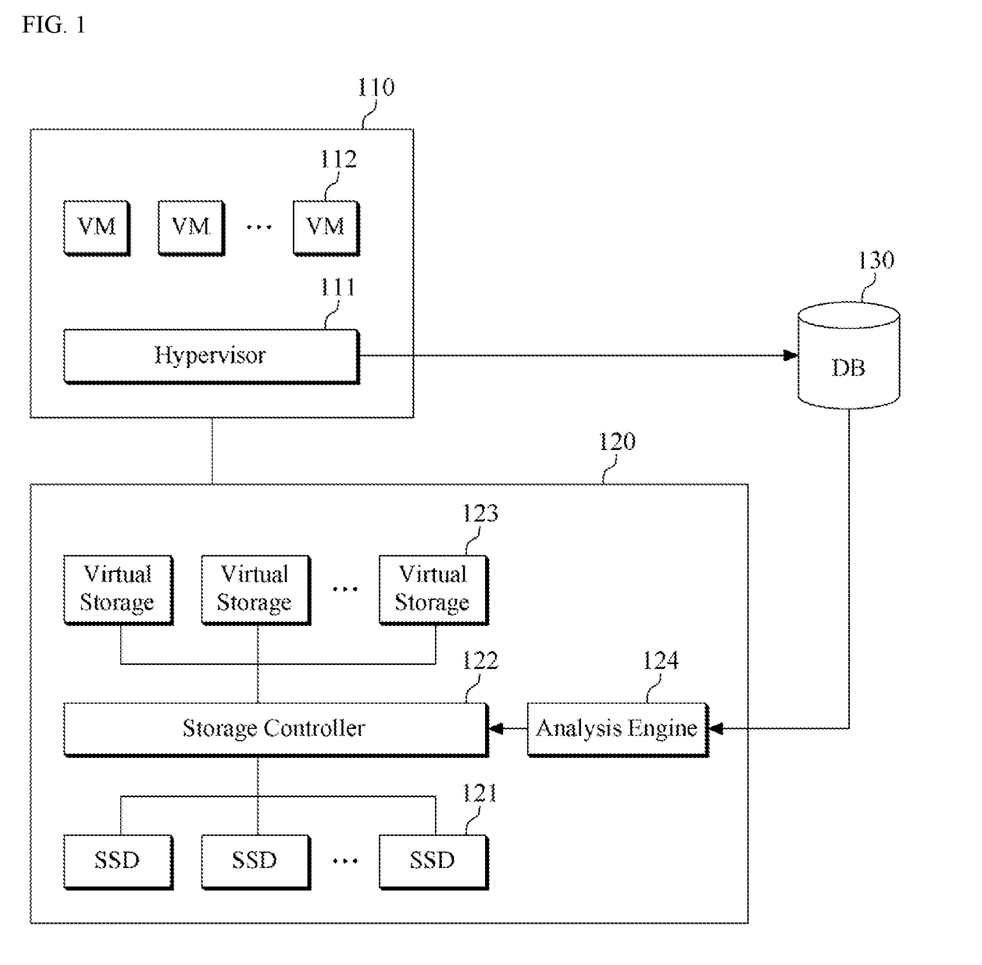
FIG. 1 illustrates a storage system for a user individual service environment according to an embodiment of the disclosure.

FIG. 1 illustrates a storage system for a user individual service environment according to an embodiment of the disclosure.

Referring to FIG. 1, a storage system according to an embodiment of the disclosure may include a host server 110 and a storage device 120 and, in some embodiments, can additionally include a database 130.

A hypervisor 111 can be operated in the host server 110, and multiple virtual machines (VM) 112 can be run on the hypervisor 111.

The storage device 120 may include a multiple number of SSD's 121, a storage controller 122, and an analysis engine 124. The SSD's 121 can be SSD's that support a NVMe interface. A virtual storage device 123 may be allotted for each virtual machine, and such virtual storage devices may use the physical resources of the SSD's.

The storage controller 122 may allot a virtual storage device 123 for each virtual machine 112 and may allot an over-provisioning space to each of the virtual storage devices 123. In one example, the storage controller 122 can include a proportion adjustment unit that adjusts the over-provisioning proportions for the virtual storage devices allotted to the respective virtual machines according to the result of I/O workload pattern analysis at the analysis engine 124 and a space allotment unit that allots the over-provisioning spaces to the virtual storage devices according to the adjusted proportions.

The database 130 may store block I/O information for the virtual machines 113, where the block I/O information may be information regarding access of data stored in the virtual machines and can be provided from the hypervisor 111. A separate agent for providing the block I/O information can be operated at the hypervisor.

The analysis engine 124 may receive the block I/O information from the database 130 to analyze the I/O workload patterns for the virtual machines. That is, the analysis engine 124 may analyze the pattern of loads created according to the input and output of data blocks. In certain embodiments, the analysis engine 124 can be included within the storage controller 122.

Figure 2:
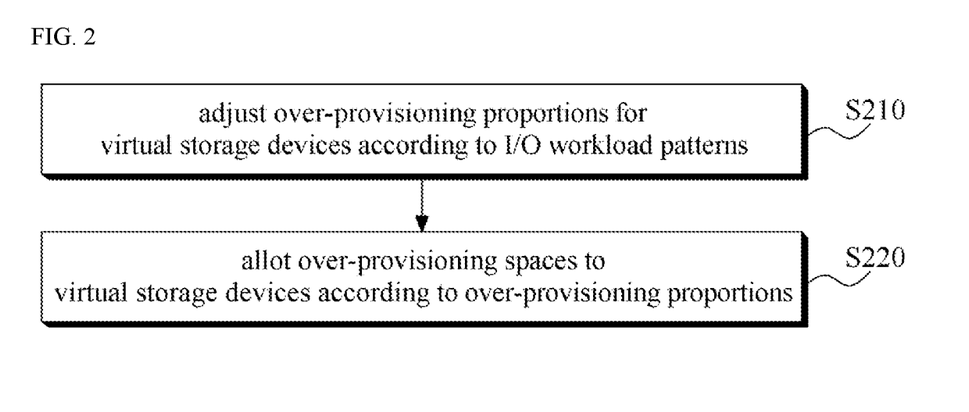
FIG. 2 illustrates a storage control method for a user individual service environment according to an embodiment of the disclosure.
Figure 3A:
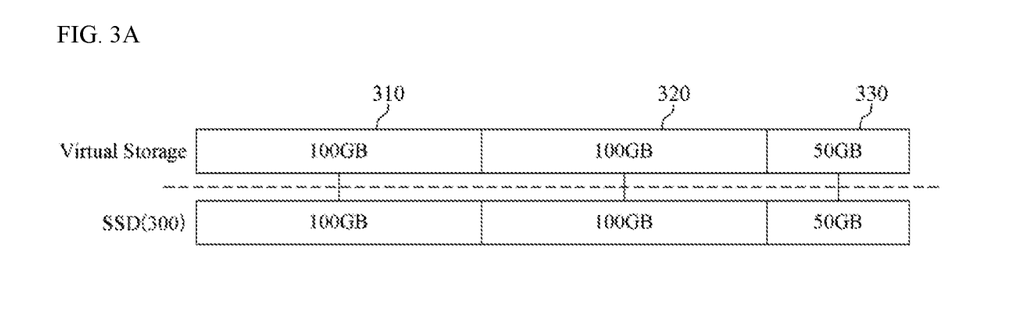
FIG. 3A and FIG. 3B illustrate an example of allotting over-provisioning spaces.
Figure 3B:
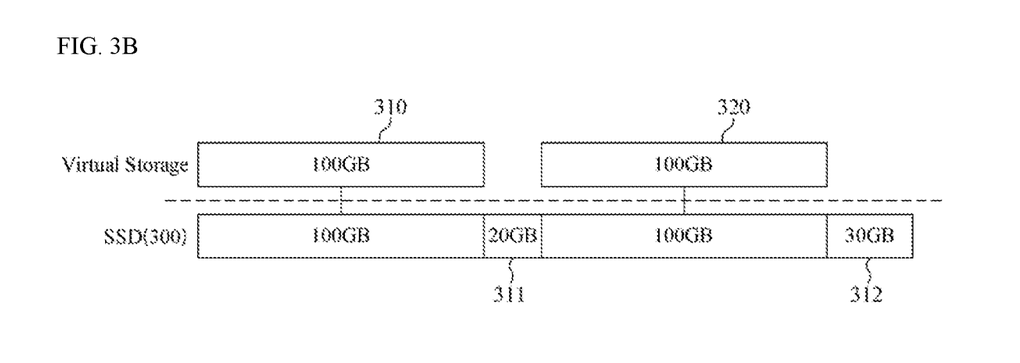

FIG. 2 illustrates a storage control method for a user individual service environment according to an embodiment of the disclosure, and FIG. 3A and FIG. 3B illustrate an example of allotting over-provisioning spaces.

A storage control method according to an embodiment of the disclosure can be performed at a storage device or a storage controller, and in the descriptions below, an embodiment is described using an example in which the storage control method is performed at a storage controller.

A storage controller according to an embodiment of the disclosure may adjust the over-provisioning proportion for the virtual storage device allotted to each virtual machine according to the I/O workload pattern of each virtual machine (S210). Then, based on the over-provisioning proportion, an over-provisioning space may be allotted to each virtual storage device (S220). Here, the over-provisioning proportion can refer to the proportion of the virtual storage device with respect to the overall space.

As the virtual storage devices may use more SSD resources by the amounts of the over-provisioning spaces additionally allotted, the possibility of foreground garbage collection being performed in the SSD's to which the virtual storage devices are allotted can be reduced. However, since increasing the over-provisioning spaces unconditionally may result in an inefficient use of the overall SSD resources, a storage controller according to an embodiment of the disclosure may adjust the over-provisioning proportions according to the I/O workload patterns.

As the speed at which resources are consumed by a virtual storage device allotted to the virtual machine having the highest I/O workload would be relatively faster than the speed at which resources are consumed by a virtual storage device allotted to the virtual machine having the lowest I/O workload, the probability of foreground garbage collection occurring may increase at the SSD to which the virtual storage device of the virtual machine having the highest I/O workload is allotted. Therefore, if the pattern shows an increase in the I/O workload in step S210, the storage controller may increase the over-provisioning proportion. Conversely, if the pattern shows a decrease in the I/O workload, the over-provisioning proportion may be decreased.

The I/O workload patterns can be provided to the storage controller after being analyzed at a separate analysis engine, or the store controller can analyze the I/O workload patterns by using the block I/O information for the virtual machines. The block I/O information can be provided from the hypervisor.

The block I/O information may be information regarding the data blocks that are written in or read from the virtual storage devices and can include, for example, at least one of a block size, an access method, and a read/write command.

The storage controller can use the block I/O information to analyze the average block size, the ratio of random accesses to sequential accesses, and the ratio of write commands to read commands, for block I/O within a preset section for each of the virtual machines.

A pattern of increasing I/O workload may correspond to an increase in the average block size (BS), an increase in the ratio (R/S) of random accesses to sequential accesses, or an increase in the ratio (W/R) of write commands to read commands. That is, when there is an increase in random accesses or an increase in write commands, the I/O workload may increase. Conversely, a pattern of decreasing I/O workload may correspond to a decrease in the average block size, a decrease in the ratio of random accesses to sequential accesses, or a decrease in the ratio of write commands to read commands.

Thus, the storage controller may increase the over-provisioning proportion in cases of increasing average block size, increasing ratio of random accesses to sequential accesses, or increasing ratio of write commands to read commands, and may decrease the over-provisioning proportion in cases of decreasing average block size, decreasing ratio of random accesses to sequential accesses, or decreasing ratio of write commands to read commands.

Depending on how an embodiment is implemented, the storage controller can adjust the over-provisioning proportions using all, some, or one of the average block size, ratio of random accesses to sequential accesses, ratio of write commands to read commands, selectively.

In one example, the storage controller can adjust the over-provisioning proportions as in Tables 1 to 3, for allotting the over-provisioning spaces.

TABLE 1

| BS | 4 KB | 8 KB | 16 KB | 32 KB |
|---|---|---|---|---|
| over-provisioning proportion | 2.5% | 5% | 7.5% | 10% |

TABLE 2

| R/S | 0~24% | 25~49% | 50~74% | 75~100% |
|---|---|---|---|---|
| over-provisioning proportion | 5% | 10% | 15% | 20% |

TABLE 3

| W/R | 0~24% | 25~49% | 50~74% | 75~100% |
|---|---|---|---|---|
| over-provisioning proportion | 5% | 10% | 15% | 20% |

For instance, if the result of the I/O workload pattern analysis for a first virtual machine is that the average block size is 8 KB, the R/S ratio is 30%, and the W/R ratio is 13%, then the storage controller can allot an over-provisioning space corresponding to the over-provisioning proportion of 20% (5%+10%+5%) to the first virtual storage device for the first virtual machine. If the capacity of the first virtual storage device 310 is 100 GB as illustrated in FIG. 3B, then an over-provisioning space 311 of 20 GB can be allotted to the first virtual storage device 310.

Further, if the result of the I/O workload pattern analysis for a second virtual machine is that the average block size is 32 KB, the R/S ratio is 48%, and the W/R ratio is 30%, then the storage controller can allot an over-provisioning space corresponding to the over-provisioning proportion of 30% (10%+10%+10%) to the second virtual storage device for the second virtual machine. If the capacity of the first virtual storage device 310 is 100 GB as illustrated in FIG. 3B, then an over-provisioning space 312 of 30 GB can be allotted to the second virtual storage device 320.

For a 250 GB SSD 300 of which the capacity has been allotted to a first to a third storage device 310, 320, 330 of 100 GB, 100 GB, and 50 GB, respectively, as illustrated in FIG. 3A, if the first to third virtual storage devices 310, 320, 330 do not have any available storage space, then foreground garbage collection may be performed in the SSD 300.

However, if over-provisioning spaces 311, 312 of 20 GB and 30 GB have been allotted to the first and second virtual storage devices 310, 320 as illustrated in FIG. 3B, even when data is stored in the 100 GB storage spaces of the first and second virtual storage devices 310, 320, foreground garbage collection may be performed in the SSD 300 due to the over-provisioning spaces 311, 312.

Consequently, according to an embodiment of the disclosure can perform background garbage collection by way of the extra space referred to here as the over-provisioning space, so as to be able to smoothly process I/O requests associated with the virtual machines.

Also, according to an embodiment of the disclosure, the over-provisioning proportions can be optimized according to I/O workload patterns, thereby increasing the performance of the virtual storage devices while minimizing wasted resources.

Figure 4:
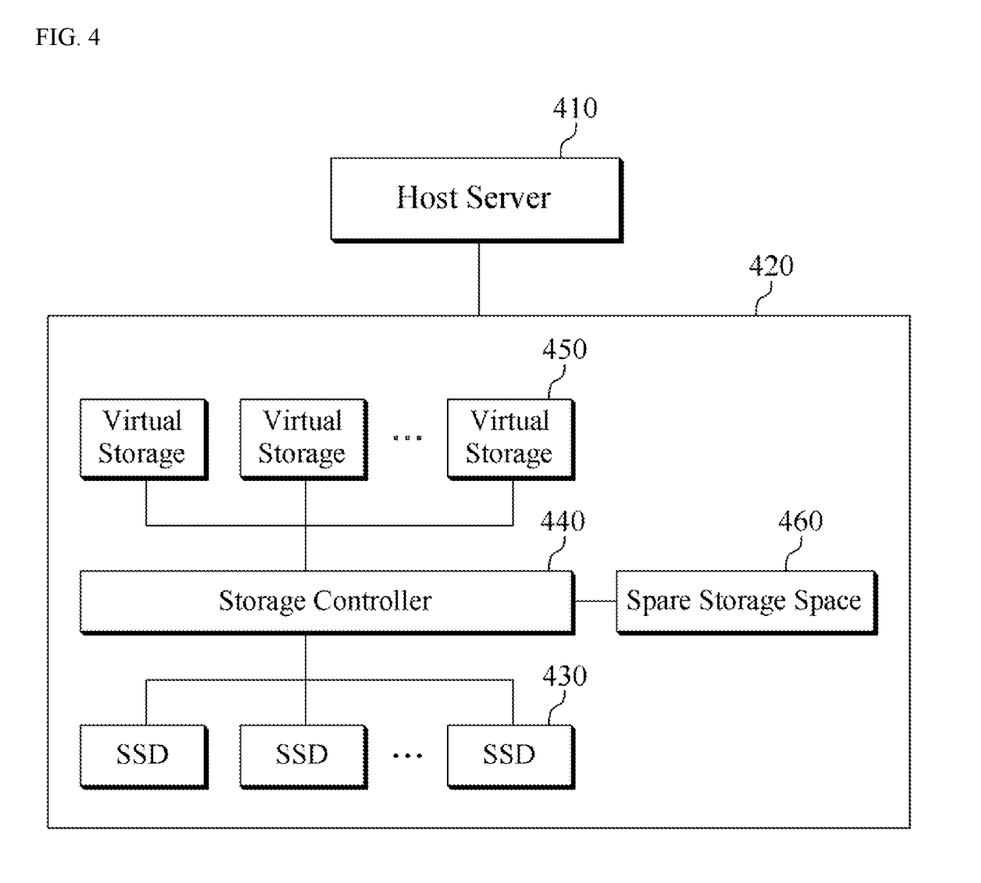
FIG. 4 illustrates a storage system for a user individual service environment according to another embodiment of the disclosure.

FIG. 4 illustrates a storage system for a user individual service environment according to another embodiment of the disclosure.

Referring to FIG. 4, a storage system according to an embodiment of the disclosure may include a host server 410 and a storage device 420.

A hypervisor can be operated at the host server 410, and a multiple number of virtual machines can be run on the hypervisor.

The storage device 420 may include a multiple number of SSD's 430, a storage controller 440, and a spare storage space 460. The SSD's 430 can be SSD's that support a NVMe interface. A virtual storage device 450 may be allotted for each virtual machine, and these virtual storage devices may use the physical resources of SSD's.

The storage controller 440 may determine the foreground garbage risk level for each of the multiple SSD's included in the storage device according to the use rate of the SSD. In one example, the foreground garbage collection risk levels can be classified into three types of a minimum risk level, an intermediate risk level, and a maximum risk level, where the risk level may be raised from minimum towards maximum with an increase in use rate. The maximum risk level can correspond to a situation of foreground garbage collection occurring.

The storage controller 440 can determine the use rates of the SSD's by monitoring the SSD's, where various methods can be used in different embodiments for determining the use rates. For instance, the storage controller 440 can determine the use rates of the SSD's by using the log information for the SSD's, the program-erase (P/E) cycles, the error information, the write information, etc., of the SSD's, or the block I/O information described above. A particular SSD can be determined to have a high use rate if there are many write requests for the SSD, or a SSD can be determined to have a high use rate if the SSD is allotted to a virtual machine having a high I/O workload.

The storage controller 440 can perform various control operations according to the foreground garbage collection risk levels of the SSD's.

For example, if a request to create a virtual storage device has occurred, the storage controller 440 can allot a virtual storage device to a SSD having a minimum risk level.

Also, the storage controller 440 can limit the I/O bandwidth of a virtual storage device allotted to a SSD having an intermediate risk level.

Also, if a write request occurs for a virtual storage device allotted to a SSD having a maximum risk level, the storage controller 440 can store the data corresponding to the write request in a spare storage space 460. A spare storage space 460 can include at least one of an over-provisioning space of a SSD, a memory having a faster write speed and longer lifetime than the SSD, and a separate storage space allotted to a SSD having a minimum risk level.

Figure 5:
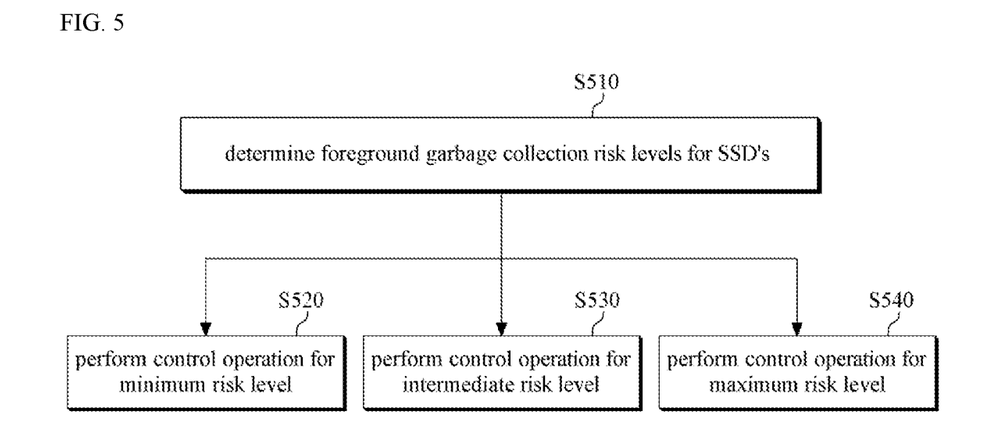
FIG. 5 illustrates a storage control method for a virtualization environment according to another embodiment of the disclosure.

FIG. 5 illustrates a storage control method for a virtualization environment according to another embodiment of the disclosure.

A storage control method according to an embodiment of the disclosure can be performed at a storage device or a storage controller, and in the descriptions below, an embodiment is described using an example in which the storage control method is performed at a storage controller.

A storage controller according to an embodiment of the disclosure may determine the garbage collection risk level for each of a multiple number of SSD's included in a storage device according to the use rate for the SSD (S510). Then, operations for controlling the storage devices may be performed according to the risk levels (S520, S530, S540).

According to an embodiment of the disclosure, occurrences of foreground garbage collection can be minimized for a continuous and stable processing of data I/O, and as the I/O requests for all SSD's included in the storage device can be uniformly distributed, the overall lifespan of the storage can be improved.

In addition, according to an embodiment of the disclosure, data I/O requests can be processed smoothly without loss of data even if foreground garbage collection does occur.

In the following, the control methods of the storage controller for different risk levels are described in further detail.

<Minimum Risk Level>

If there occurs a request for creating a virtual storage device, the storage controller may allot the virtual storage device to a SSD having a minimum risk level. Also, the storage controller can re-allot a virtual storage device that was previously allotted to a SSD having an intermediate or a maximum risk level to a SSD having a minimum risk level.

<Intermediate Risk Level>

A storage controller according to an embodiment of the disclosure may limit the I/O bandwidth for a virtual storage device allotted to a SSD that experiences an increase in use rate and changes from a minimum risk level to an intermediate risk level. For instance, the bandwidth can be limited from 400 MB/s to 200 MB/s, where the limited bandwidth can be determined in various ways according to the implementation of different embodiments.

If the use rate of the SSD decreases as a result of limiting the I/O bandwidth, the risk level of the SSD can be changed from an intermediate risk level to a minimum risk level.

If the risk level of the SSD does not change to a minimum risk level from the intermediate risk level within a preset duration of time since the limiting of the I/O bandwidth, then, since the risk level of the SSD is liable to change from the intermediate risk level to a maximum risk level, the storage controller can re-allot the virtual storage device allotted to the SSD having the intermediate risk level to another SSD having a minimum risk level.

<Maximum Risk Level>

A storage controller according to an embodiment of the disclosure may check the access request for a virtual storage device allotted to a first SSD having a maximum risk level, meaning that foreground garbage collection has already occurred. If the access request is a read request, the storage controller may read the requested data from the first SSD. However, if the access request is a write request, the storage controller may perform the writing, i.e. store the data associated with the write request, in the spare storage space. This is because the writing cannot be performed in the SSD where foreground garbage collection has started.

Here, the spare storage space can be the over-provisioning space of the SSD or a memory having a faster write speed and longer lifetime than the SSD such as, for instance, a 3D XPoint memory.

The storage controller can primarily store the data of the write request in the over-provisioning space or the memory, and in cases where the over-provisioning space or the memory has insufficient storage space, can perform the writing in a separate storage space allotted to a second SSD having a minimum risk level. Here, the storage controller can write some of the data associated with the write request in a separate storage space of the second SSD based on the access frequency of the data associated with the write request. That is, data blocks of low use rate can be flushed from the over-provisioning space or the memory to a separate storage space of the second SSD. The separate storage space is allotted to a SSD having a minimum risk level separately from the over-provisioning space for the maximum risk level.

When the foreground garbage collection is completed, the risk level of the first SSD may be changed from the maximum risk level to an intermediate risk level, and the storage controller may restore the data written in the spare storage space to the first SSD to which the access request was made. Afterwards, if the risk level of the first SSD does not change to a minimum risk level within a preset duration of time, the storage controller can re-allot the virtual storage device originally allotted to the first SSD to a SSD having a minimum risk level.

The technology described above can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the embodiments or can be a type of medium known to and used by the skilled person in the field of computer software. A computer-readable medium may include a hardware device that is specially configured to store and execute program instructions. Some examples may include magnetic media such as hard disks, floppy disks, and magnetic tapes, optical media such as CD-ROM's and DVD's, magneto-optical media such as floptical disks, and hardware devices such as ROM, RAM, flash memory, etc. Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments, and vice versa.

While the present disclosure is described above by way of limited embodiments and drawings that refer to particular details such as specific elements, etc., these are provided only to aid the general understanding of the present disclosure. The present disclosure is not to be limited by the embodiments above, and the person having ordinary skill in the field of art to which the present disclosure pertains would be able to derive numerous modifications and variations from the descriptions and drawings above. Therefore, it should be appreciated that the spirit of the present disclosure is not limited to the embodiments described above. Rather, the concepts set forth in the appended scope of claims as well as their equivalents and variations are encompassed within the spirit of the present disclosure.

What is claimed is:

1. A storage control method for a virtualization environment, the storage control method comprising:
   analyzing I/O workload patterns by using block I/O information for virtual machines;
   adjusting an over-provisioning proportion for a virtual storage device allotted to each virtual machine according to the I/O workload pattern for each of the virtual machines; and
   allotting an over-provisioning space for each of the virtual storage devices according to the over-provisioning proportion,
   wherein the block I/O information includes at least one of a block size, access method, and a read/write command,
   wherein the analyzing of the I/O workload patterns comprises analyzing an average block size, a ratio of random accesses to sequential accesses, and a ratio of write commands to read commands, for block I/O within a preset section for each of the virtual machines,
   wherein the adjusting of the over-provisioning proportion comprises increasing the over-provisioning proportion if the ratio of write commands to read commands increases.

2. The storage control method of claim 1, wherein the adjusting of the over-provisioning proportion comprises:
   increasing the over-provisioning proportion if the average block size increases.

3. The storage control method of claim 1, wherein the adjusting of the over-provisioning proportion comprises:
   increasing the over-provisioning proportion if the ratio of random accesses to sequential accesses increases.

4. The storage control method of claim 1, wherein the adjusting of the over-provisioning proportion comprises:
   increasing the over-provisioning proportion if the I/O workload shows an increasing pattern, and
   decreasing the over-provisioning proportion if the I/O workload shows a decreasing pattern.

5. A storage control method for a virtualization environment, the storage control method comprising:
   determining a foreground garbage collection risk level for each of a plurality of SSD's included in a storage device according to a use rate of the SSD;
   writing in a spare storage space if there occurs a write request for a virtual storage device allotted to a first SSD having a maximum risk level of foreground garbage collection occurring;
   restoring data written in the spare storage space to the first SSD when the foreground garbage collection is completed;
   allotting a virtual storage device to a second SSD having a minimum risk level;
   limiting an I/O bandwidth for the virtual storage device allotted to the second SSD if a risk level of the second SSD having a minimum risk level is changed to an intermediate risk level; and
   re-allotting the virtual storage device allotted to the second SSD to a third SSD having a minimum risk level if the risk level of the second SSD is not changed to a minimum risk level within a preset duration of time after the limiting of the I/O bandwidth.

6. The storage control method of claim 5, wherein the spare storage space comprises at least one of an over-provisioning space of the SSD, a memory having a faster writing speed and longer lifetime than the SSD, and a separate storage space allotted to the second SSD having a minimum risk level separately from the over-provisioning space.

7. The storage control method of claim 6, wherein the writing in the spare storage space comprises:
   writing in the separate storage space if the over-provisioning space or the memory has insufficient storage space.

8. The storage control method of claim 7, wherein the writing in the spare storage space comprises:
   writing in the separate storage space a portion of the data associated with the write request according to an access frequency of the data associated with the write request.

* * * * *